(12) United States Patent
Lin et al.

(10) Patent No.: US 9,677,200 B2
(45) Date of Patent: Jun. 13, 2017

(54) METHOD FOR MAKING CARBON NANOTUBE COMPOSITE WIRE

(71) Applicants: Tsinghua University, Beijing (CN); HON HAI PRECISION INDUSTRY CO., LTD., New Taipei (TW)

(72) Inventors: Xiao-Yang Lin, Beijing (CN); Peng Liu, Beijing (CN); Li-Na Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 304 days.

(21) Appl. No.: 14/487,990

(22) Filed: Sep. 16, 2014

(65) Prior Publication Data

US 2015/0361589 A1    Dec. 17, 2015

(30) Foreign Application Priority Data

Jun. 17, 2014  (CN) .......................... 2014 1 0269325

(51) Int. Cl.
*B29C 65/02* (2006.01)
*D02G 3/26* (2006.01)
*B29C 65/18* (2006.01)

(52) U.S. Cl.
CPC .............. *D02G 3/26* (2013.01); *B29C 65/18* (2013.01)

(58) Field of Classification Search
None
See application file for complete search history.

(56) References Cited

U.S. PATENT DOCUMENTS

| 6,601,377 | B2 * | 8/2003 | Tsukamoto | D02G 3/06 |
| | | | | 277/650 |
| 9,093,199 | B2 * | 7/2015 | Lin | H01B 12/02 |
| 9,528,198 | B2 * | 12/2016 | Cooper | D02G 3/16 |
| 2012/0045644 | A1 * | 2/2012 | Wei | B82B 1/002 |
| | | | | 428/368 |
| 2012/0100203 | A1 * | 4/2012 | Fang | H01M 4/131 |
| | | | | 424/443 |
| 2012/0298289 | A1 * | 11/2012 | Jiang | C01B 31/0469 |
| | | | | 156/155 |

FOREIGN PATENT DOCUMENTS

| CN | 102372253 A | 3/2012 |
| CN | 102795613 A | 11/2012 |
| CN | 103474170 | 12/2013 |
| CN | 103700440 A | 4/2014 |
| JP | 2014180098 | * 9/2014 |

* cited by examiner

*Primary Examiner* — Edmund Lee
(74) *Attorney, Agent, or Firm* — Steven Reiss (57) ABSTRACT

A method for making carbon nanotube composite wire includes providing at least one carbon nanotube film. A graphene film is grown on a top surface of a substrate. The at least one carbon nanotube film is pasted with the graphene film. The substrate is removed to form a carbon nanotube/graphene composite film. The carbon nanotube/graphene composite film is curled and then twisted.

20 Claims, 11 Drawing Sheets

METHOD FOR MAKING CARBON NANOTUBE COMPOSITE WIRE

CROSS-REFERENCE TO RELATED APPLICATIONS

This application claims all benefits accruing under 35 U.S.C. §119 from China Patent Application No. 201410269325.X, filed on Jun. 17, 2014, in the China Intellectual Property Office. This application is related to commonly-assigned application entitled, "METHOD FOR MAKING CARBON NANOTUBE COMPOSITE WIRE", concurrently filed Ser No. 14/500,467. Disclosures of the above-identified applications are incorporated herein by reference.

FIELD

The present application relates to a method for making a carbon nanotube composite wire.

BACKGROUND

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures such as carbon nanotube wires has attracted attention.

A carbon nanotube wire having a macro-scale carbon nanotube structure is directly drawn from a carbon nanotube array on a substrate. The carbon nanotube wire includes a plurality of successive carbon nanotubes substantially oriented along a same direction. The carbon nanotubes joined end to end by van der Waals attractive force therebetween.

However, the carbon nanotubes are only joined by the van der Waals attractive force therebetween, thus a mechanical strength of the carbon nanotube wire needs to be improved.

What is needed, therefore, is to provide a method for making a carbon nanotube composite wire that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
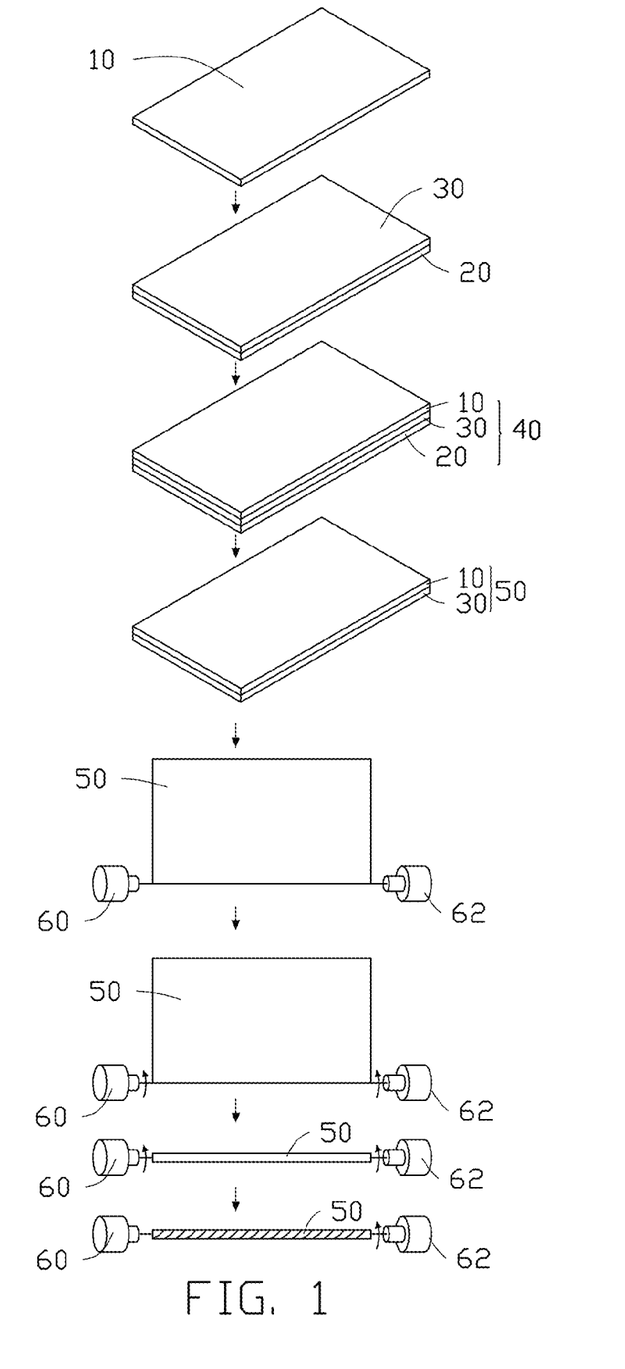
FIG. 1 is a schematic process view of one embodiment of a method for making a carbon nanotube composite wire.

Referring to FIG. 1, a method for making a carbon nanotube composite wire of one embodiment includes the following steps:

(S10), providing at least one carbon nanotube film 10;

(S20), growing a graphene film 30 on a top surface 22 of a substrate 20;

(S30), forming a composite structure 40 by pasting the at least one carbon nanotube film 10 with the graphene film 30;

(S40), forming a carbon nanotube/graphene composite film 50 by removing the substrate 20;

(S50), forming a carbon nanotube composite wire 80 by curling the carbon nanotube/graphene composite film 50 and then twisting.

In the step (S10), the carbon nanotube film 10 includes a plurality of carbon nanotubes uniformly distributed therein. The plurality of carbon nanotubes can be combined by van der Waals attractive force. The plurality of carbon nanotubes may be single-walled, double-walled, multi-walled carbon nanotubes, or their combinations. The carbon nanotubes which are single-walled have a diameter of about 0.5 nanometers (nm) to about 50 nm. The carbon nanotubes which are double-walled have a diameter of about 1.0 nm to about 50 nm. The carbon nanotubes which are multi-walled have a diameter of about 1.5 nm to about 50 nm. A thickness of the carbon nanotube film 10 can be in a range from about 0.5 nanometers to about 1 centimeter. In one embodiment, the thickness of the carbon nanotube film 10 is in a range from about 100 micrometers to about 0.5 millimeters.

The carbon nanotubes in the carbon nanotube film 10 can be orderly or disorderly arranged. The term 'disordered carbon nanotube' refers to the carbon nanotube film 10 where the carbon nanotubes are arranged along many different directions, and the aligning directions of the carbon nanotubes are random. The number of the carbon nanotubes arranged along each different direction can be almost the same (e.g. uniformly disordered). The carbon nanotubes can be entangled with each other.

The term 'ordered carbon nanotube' refers to the carbon nanotube film 10 where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

The carbon nanotube film 10 is a free-standing film. The term "free-standing" includes, but not limited to, the carbon nanotube layer structure that does not have to be supported by a substrate. For example, the free-standing carbon nanotube film 10 can sustain the weight of itself when it is hoisted by a portion thereof without any significant damage to its structural integrity. So, if the free-standing carbon nanotube film 10 is placed between two separate supporters, a portion of the free-standing carbon nanotube film 10, not in contact with the two supporters, would be suspended between the two supporters and yet maintain film structural integrity. The carbon nanotube film 10 can includes a drawn carbon nanotube film, a flocculated carbon nanotube film, or a pressed carbon nanotube film.

Figure 2:
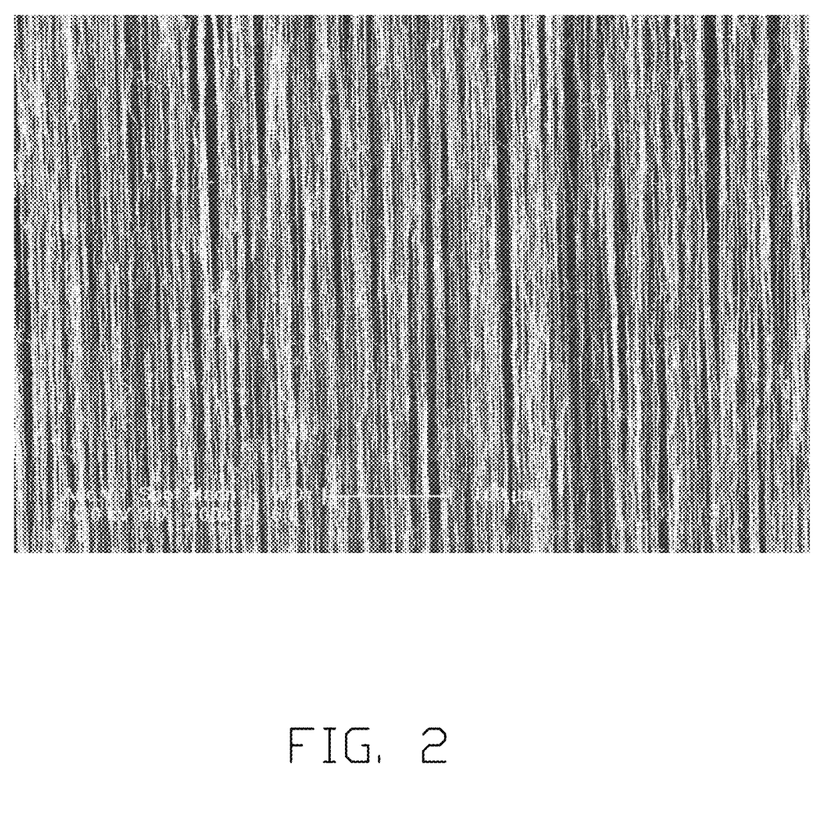
FIG. 2 is a scanning electron microscope (SEM) image of a drawn carbon nanotube film.

Referring to FIG. 2, the drawn carbon nanotube film includes a plurality of successive and oriented carbon nanotubes joined end-to-end by van der Waals attractive force therebetween. The carbon nanotubes in the drawn carbon nanotube film oriented along a preferred orientation. The carbon nanotubes are parallel to a surface of the drawn carbon nanotube film. The drawn carbon nanotube film can bend to desired shapes without breaking. A film can be drawn from a carbon nanotube array to form the drawn carbon nanotube film.

When the carbon nanotube film 10 includes at least two stacked drawn carbon nanotube films, adjacent drawn carbon nanotube films can be combined by only the van der Waals attractive force therebetween. Additionally, when the carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can be in a range from about 0 degree to about 90 degrees. Stacking the drawn carbon nanotube films will improve the mechanical strength of the carbon nanotube composite wire 80. In one embodiment, the carbon nanotube film 10 includes two layers of the drawn carbon nanotube films, and the angle between the aligned directions of the carbon nanotubes in two adjacent drawn carbon nanotube films is about 90 degrees.

Figure 3:
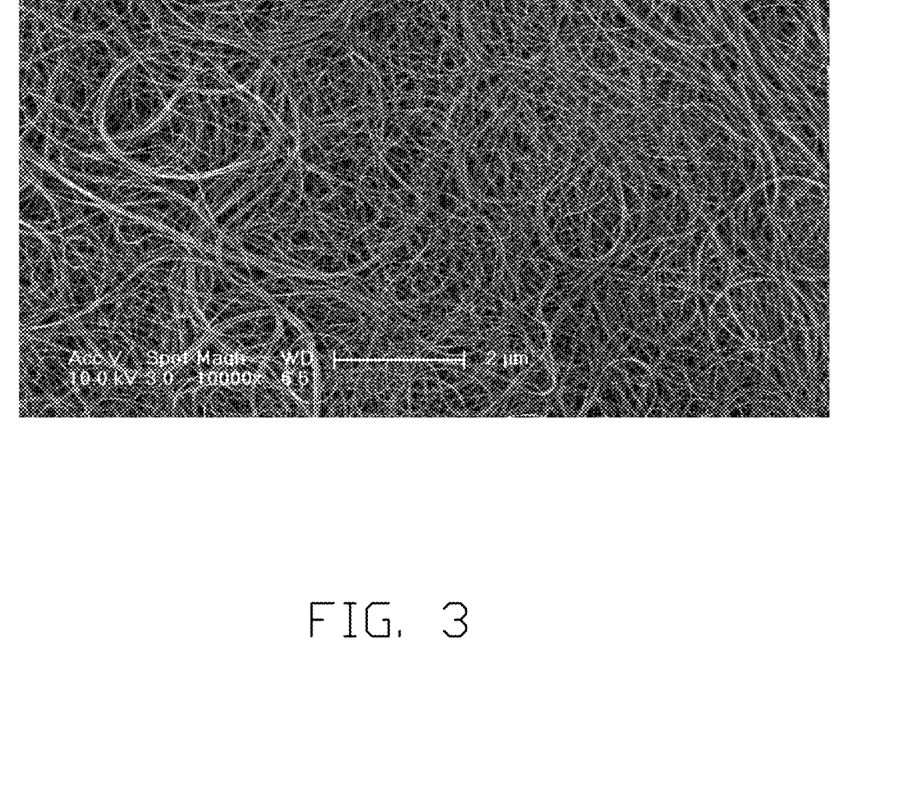
FIG. 3 is an SEM image of a flocculated carbon nanotube film.

Referring to FIG. 3, the flocculated carbon nanotube film includes a plurality of long, curved, disordered carbon nanotubes entangled with each other. The flocculated carbon nanotube film can be isotropic. The carbon nanotubes can be substantially uniformly dispersed in the flocculated carbon nanotube film. Adjacent carbon nanotubes are acted upon by van der Waals attractive force to obtain an entangled structure. Due to the carbon nanotubes in the flocculated carbon nanotube film being entangled with each other, the flocculated carbon nanotube film has excellent durability, and can be fashioned into desired shapes with a low risk to the integrity of the flocculated carbon nanotube film.

Figure 4:
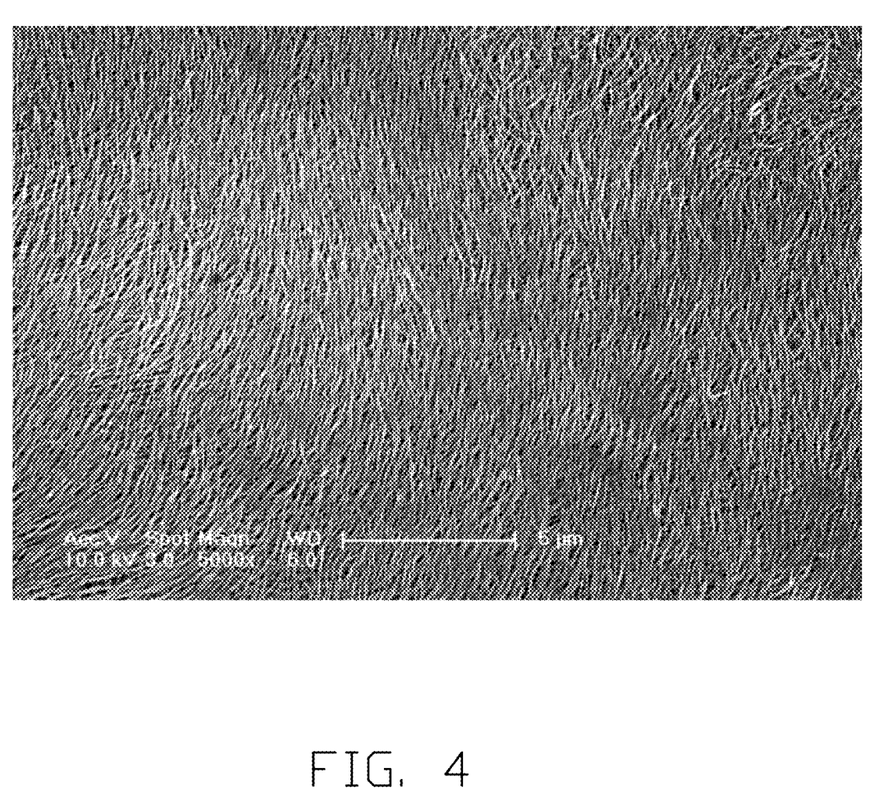
FIG. 4 is an SEM image of a pressed carbon nanotube film including a plurality of carbon nanotubes arranged along a same direction.
Figure 5:
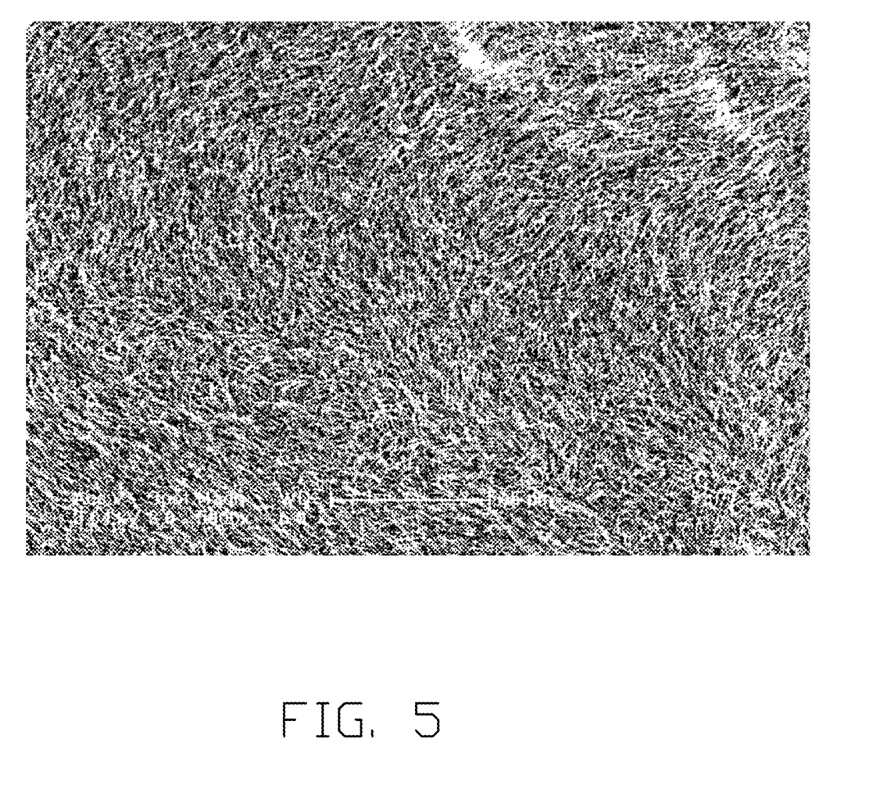
FIG. 5 is an SEM image of a pressed carbon nanotube film including a plurality of carbon nanotubes which is arranged along different direction.

Referring to FIGS. 4 and 5, the pressed carbon nanotube film includes a plurality of carbon nanotubes. The carbon nanotubes in the pressed carbon nanotube film can be arranged along a same direction, as shown in FIG. 4. The carbon nanotubes in the pressed carbon nanotube film can be arranged along different directions, as shown in FIG. 5. The carbon nanotubes in the pressed carbon nanotube film can rest upon each other. An angle between a primary alignment direction of the carbon nanotubes and a surface of the pressed carbon nanotube film is about 0 degree to approximately 15 degrees. The greater the pressure applied, the smaller the angle obtained. If the carbon nanotubes in the pressed carbon nanotube film are arranged along different directions, the pressed carbon nanotube film can have properties that are identical in all directions substantially parallel to the surface of the pressed carbon nanotube film. Adjacent carbon nanotubes are attracted to each other and are joined by van der Waals attractive force. Therefore, the pressed carbon nanotube film is easy to bend to desired shapes without breaking.

Figure 6:
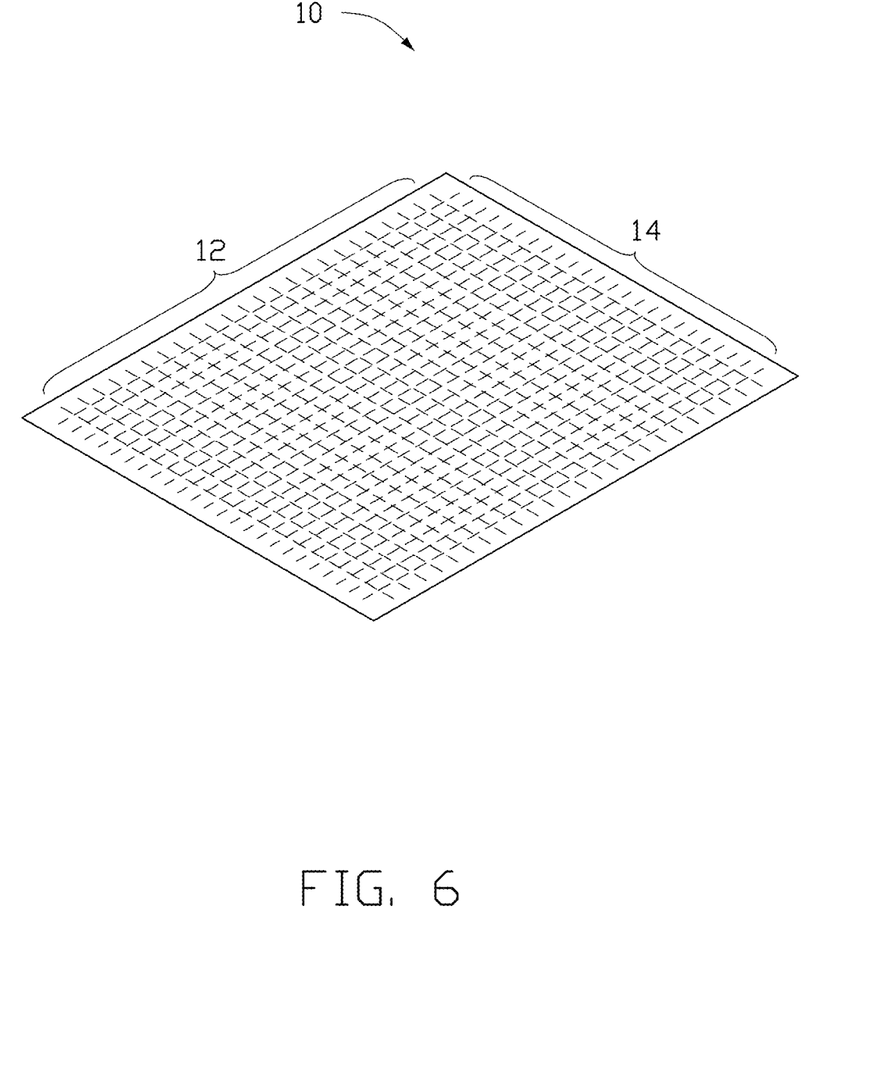
FIG. 6 is a schematic view of one embodiment of a carbon nanotube film including a plurality of carbon nanotube wires.

Referring to FIG. 6, the carbon nanotube film 10 can includes a plurality of first carbon nanotube wire structures 12 and a plurality of second carbon nanotube wire structures 14. The plurality of first carbon nanotube wire structures 12 and the plurality of second carbon nanotube wire structures 14 intersect each other to form a carbon nanotube network structure. The plurality of first carbon nanotube wire structures 12 can be parallel to each other. The plurality of second carbon nanotube wire structures 14 can be parallel to each other. If the plurality of first carbon nanotube wire structures 12 are arranged along a first direction and spaced from each other, the plurality of second carbon nanotube wire structure 14 can be arranged along a second direction and spaced from each other. An angle between the first direction and the second direction can be in a range from about 0 degrees to about 90 degrees. A distance between the adjacent first carbon nanotube wire structures 12 is not limited and can be in a range from about 10 micrometers to about 1000 micrometers. A distance between the adjacent second carbon nanotube wire structures 14 is not limited and can be in a range from about 10 micrometers to about 1000 micrometers. In one embodiment, the distance between adjacent first carbon nanotube wire structures 12 is in a range from about 10 micrometers to about 500 micrometers, and the distance between adjacent second carbon nanotube wire structures 14 is also in a range from about 10 micrometers to about 500 micrometers. The intersections between the plurality of first carbon nanotube wire structures 12 and the plurality of second carbon nanotube wire structures 14 are not limited. For example, the plurality of first carbon nanotube wire structures 12 and the plurality of second carbon nanotube wire structures 14 can be woven together, or the plurality of first carbon nanotube wire structures 12 can be in contact with the plurality of second carbon nanotube wire structures 14 and be disposed at a same side of the plurality of second carbon nanotube wire structures 14. The contact portions of the plurality of first carbon nanotube wire structures 12 and the plurality of second carbon nanotube wire structures 14 can be fixed together by an adhesive. In addition, the plurality of first carbon nanotube wire structures 12 and the plurality of second carbon nanotube wire structures 14 can be combined with each other by heat pressing.

The plurality of first carbon nanotube wire structures 12 and the plurality of second carbon nanotube wire structures 14 include at least one carbon nanotube wire. When the plurality of first carbon nanotube wire structures 12 and the plurality of second carbon nanotube wire structures 14 includes a plurality of carbon nanotube wires, the plurality of carbon nanotube wires can be substantially parallel with each other, or twisted with each other.

Figure 7:
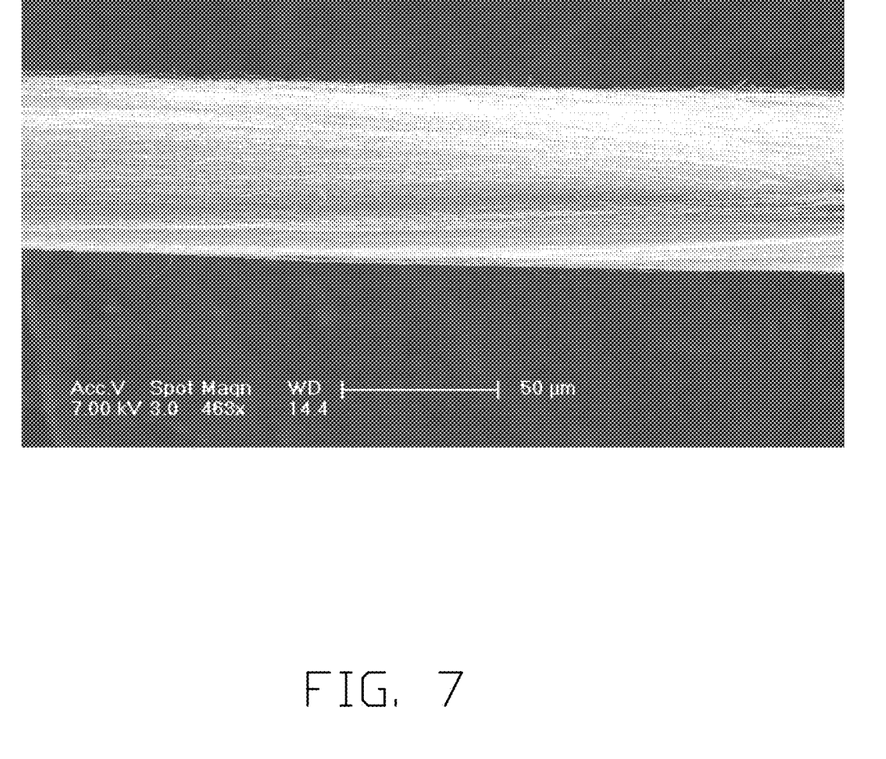
FIG. 7 is an SEM image of an untwisted carbon nanotube wire.

Each of the plurality of carbon nanotube wire can be untwisted or twisted. The untwisted carbon nanotube wire can be obtained by treating the drawn carbon nanotube film drawn from the carbon nanotube array with a volatile organic solvent. Specifically, the volatile organic solvent is applied to soak the entire surface of the drawn carbon nanotube film. During the soaking, adjacent parallel carbon nanotubes in the drawn carbon nanotube film will bundle together, due to the surface tension of the volatile organic solvent as it volatilizes, and thus, the drawn carbon nanotube film will be pulled together to form the untwisted carbon nanotube wire. Referring to FIG. 7, the untwisted carbon nanotube wire includes a plurality of carbon nanotubes substantially oriented along a same direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotubes joined end to end by van der Waals attractive force therebetween.

Figure 8:
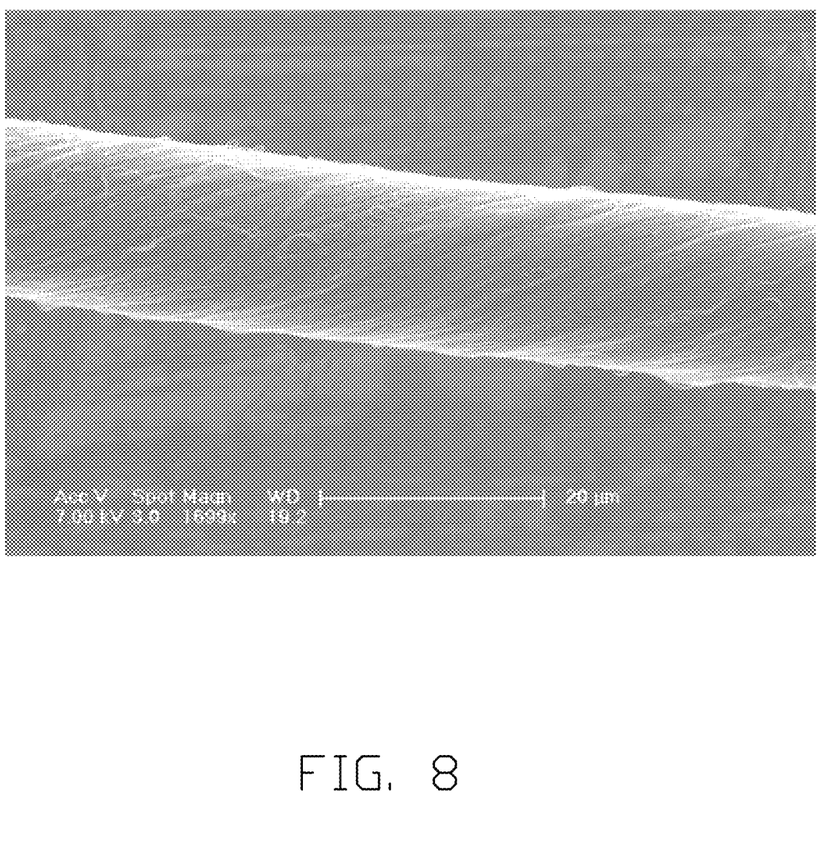
FIG. 8 is an SEM image of a twisted carbon nanotube wire.

The twisted carbon nanotube wire can be formed by twisting the drawn carbon nanotube film using a mechanical force to turn the two ends of the drawn carbon nanotube film in opposite directions. Referring to FIG. 8, the twisted carbon nanotube wire includes a plurality of carbon nanotubes helically oriented around an axial direction of the twisted carbon nanotube wire.

In the step (S20), the substrate 20 can be made of a metal material, such as copper or nickel. A shape of the substrate 20 is not limited. The substrate 20 includes the top surface 22 and a low surface 24 opposite to the top surface 22. The top surface 22 of the substrate 20 can be a planar or curved surface. A size (e.g. area) of the substrate 20 is not limited and can be set as desired. A thickness of the substrate 20 can be in a range from about 100 nanometers to about 100 micrometers. In one embodiment, the substrate 20 is copper sheet with a thickness of about 25 micrometers.

The graphene film 30 can be grown on the substrate 20 by chemical vapor deposition (CVD), mechanical pressure method, Langmuir-Blodgett (LB) method, solution method, or tearing from oriented graphite using a tape.

In one embodiment, the graphene film 30 is directly grown on the metal substrate 100 by the CVD method. The CVD method includes:

(S21), disposing the substrate 20 in a reacting chamber;

(S22), heating the substrate 20 to a predetermined temperature;

(S23), supplying a carbon source gas into the reacting chamber, thereby forming the graphene film 30 on the top surface 22 of the substrate 20.

In step (S21), the reacting chamber can provide a reaction space for forming the graphene film 30. The reacting chamber can have a sealed cavity. The reacting chamber includes a gas inlet and a gas outlet. The gas inlet is used to input a reaction gas. The gas outlet is connected with an evacuating device. The evacuating device can be used to adjust vacuum degree or atmospheric pressure in the reacting chamber. Furthermore, the reacting chamber can include a water cooling device used to adjust the temperature in the reacting chamber. The reacting chamber can be a quartz tube furnace. An area of the substrate 20 can be adjusted according to the volume of space in the reacting chamber. The substrate 20 having a relatively large area can be bent or curved to be put in the reacting chamber.

In step (S22), the top surface 22 of the substrate 20 is heated to become more flat and has larger crystal grain. The flatter the top surface 22, the easier to form an uniform graphene film 30 on the top surface 22 of the substrate 20. The reacting chamber is evacuated before heating the substrate 20. In one embodiment, hydrogen gas can be imported in the reacting chamber through the gas inlet before heating the substrate 20. The hydrogen gas can reduce an oxide layer on the top surface 22 of the substrate 20, and can further prevent the substrate 20 from being oxidized. A flow rate of the hydrogen gas can be in a range from about 2 standard cubic centimeters per minute (sccm) to about 35 sccm. The heating temperature can be in a range from about 800° C. to about 1500° C. The heating period can be in a range from about 20 minutes to about 60 minutes. An atmospheric pressure in the reacting chamber can be in a range from about $10^{-1}$ Pa to about $10^2$ Pa. In one embodiment, the flow rate of the hydrogen gas is about 2 sccm, the atmospheric pressure of the reacting chamber is about 13.3 Pa, the heating temperature is about 1000° C., a temperature rising period is about 40 minutes, and a constant temperature period at the heating temperature is about 20 minutes.

In step (S23), carbon atoms can be deposited on the top surface 22 of the substrate 20, thereby forming the graphene film 30 composed of the carbon atoms. The hydrogen gas is continuously imported through the gas inlet. The flow rate of the hydrogen gas, while the carbon source gas is supplied into the reacting chamber, is the same as that of the step (S22). The carbon source gas can be at least one of methane, ethane, ethylene, or acetylene. While supplying the carbon source gas, the temperature in the reaction chamber can be in a range from about 800° C. to about 1500° C., and the constant temperature period can be in a range from about 10 minutes to about 60 minutes. The atmospheric pressure in the reacting chamber can be in a range from about $10^{-1}$ Pa to about $10^2$ Pa. In one embodiment, the atmospheric pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

Furthermore, the substrate 20 can be cooled after forming the graphene film 30 thereon. During the cooling of the substrate 20, the carbon source gas and the hydrogen gas can continuously flow into the reacting chamber. The flow rate of the carbon source gas and the hydrogen gas and the atmospheric pressure of the reacting chamber are constant in the heating step. In one embodiment, the substrate 20 is cooled for about 1 hour. After cooling the substrate 20, the substrate 20 with graphene film 30 grown thereon is taken out of the reacting chamber.

In the step (S30), the composite structure 40 can be formed by locating a macromolecule material layer between the carbon nanotube film 10 and the graphene film 30, pressing technology, or organic solvent. The carbon nanotube film 10 can be directly stacked on the graphene film 30 because the carbon nanotube film 10 is very pure and has viscidity.

In detail, the pressing technology includes hot pressing technology and cold pressing technology. In one embodiment, the hot pressing process includes: (a) disposing the laminate structure including the carbon nanotube film 10, the substrate 20, and the graphene film 30 in a hot pressing device having a metal roll; (b) heating the metal roll using the heating element of the hot pressing device, wherein the heating temperature can be in a range from about 110° C. to about 120° C.; and (c) hot pressing the laminate structure using the heated metal roll.

The heated metal roll can continuously roll on the laminate structure, thereby applying a pressure on the laminate structure. A rolling speed of the metal roll can be in a range from about 1 millimeter per minute to about 10 meters per minute. In addition, the graphene film 30 can soften while pressing the laminate structure, and the air between the graphene film 30 and the carbon nanotube film 10 can be expelled. Thus, the carbon nanotube film 10 and the graphene film 30 can be closely pressed together. In one embodiment, the pressure applied by the metal roll is in a range from about 49 Pa to about 196 Pa. In addition, the graphene film 30 is not easily destroyed, because the graphene film 30 is disposed between the carbon nanotube film 10 and the substrate 20, and the graphene film 30 does not directly contact the metal roll.

Forming the composite structure 40 by organic solvent includes: (a) infiltrating the organic solvent into the laminate structure; and (b) removing the organic solvent to closely combine the carbon nanotube film 10 and the graphene film 30 together due to the surface tension of the organic solvent as the organic solvent volatilizes.

The organic solvent can be dropped into the laminate structure using a dropper, or the laminate structure can be immersed into a container having the organic solvent. The organic solvent can be a volatile organic solvent. The organic solvent can be ethanol, methanol, acetone, dichloroethane, chloroform, or any combination thereof. In one embodiment, the organic solvent is ethanol.

In one embodiment, the organic solvent can be removed by a supercritical carbon dioxide method. The supercritical carbon dioxide method includes: (a) disposing the laminate structure infiltrated by the organic solvent into a sealing device, wherein the sealing device has an inlet and an outlet; (b) gradually extracting the organic solvent from the outlet while importing a liquid carbon dioxide into the sealing device from the inlet by a vacuum, wherein a temperature and a pressure of the sealing device need to be adjusted so that the liquid carbon dioxide exists in the supercritical state; and (c) removing the liquid carbon dioxide from the sealing device after the organic solvent has been completely removed. In one embodiment, the temperature of the sealing device is about 35° C., and the pressure of the sealing device is about 9 MPa.

In the step (S40), the substrate 20 can be removed by a solution erosion technology. The erosion technology can be selected according to material of the substrate 20. In one embodiment, the substrate 20 is a copper substrate, the solution is concentrated nitric acid. The composite structure 40 is immersed into the concentrated nitric acid, thereby causing a reaction between the copper substrate and the concentrated nitric acid. The copper substrate is completely removed due to the reaction, and the carbon nanotube/graphene composite film 50 is formed. The solution erosion technology is simple and easy to operate. The carbon nanotube/graphene composite film 50 can be taken out from the solution. The carbon nanotube film 10 has an excellent strength and can support the graphene film 30. Thus, the graphene film 30 is not easily broken due to a gravity of the solution.

Furthermore, the solution can be removed after the reaction has completed. In one embodiment, the solution is removed by the supercritical carbon dioxide method, by which destruction of the graphene film 30 due to surface tension of the remaining solution can be avoided. Subsequently, the carbon nanotube/graphene composite film 50 can be repeatedly washed with deionized water. In one embodiment, the carbon nanotube/graphene composite film 50 can be washed with deionized water for 15 minutes, using 300 mL of deionized water.

In the step (S50), the carbon nanotube composite wire 80 can be formed by at least three methods: a method (1); a method (2); or a method (3) as described below.

Referring to FIG. 1, in the method (1), the carbon nanotube/graphene composite film 50 is placed between separate first supporter 60 and second supporter 62. The first supporter 60 and second supporter 62 are rotated at the same time, thus the carbon nanotube/graphene composite film 50 is curled to form a composite wire 70. The composite wire 70 is a cylindrical structure. The rotational speed of the first supporter 60 is equal to a rotational speed of the second supporter 62. For example, the carbon nanotube/graphene composite film 50 is rectangular with four sides AB, BC, CD, and DA. The carbon nanotube/graphene composite film 50 is curled along a direction from side AB to side CD. A curl direction is perpendicular to side AB from beginning to end. And then, the first supporter 60 stops to rotate and the second supporter 62 continues to rotate, the composite wire 70 is twisted to form the carbon nanotube composite wire 80. In one embodiment, when the carbon nanotube/graphene composite film 50 is curled, side AB is close to the graphene film 30 from beginning to end.

It is to be understood the composite wire 70 can be twisted by rotating the first supporter 60 and the second supporter 62 along two opposite directions. The number of turns of rotating the first supporter 60 and the second supporter 62 is related to a length of the carbon nanotube film 10. In one embodiment, when the length of the carbon nanotube film 10 is 1 meter, the number of turns of rotating the first supporter 60 and the second supporter 62 is in a range from about 1000 to about 1500.

While rotating the carbon nanotube/graphene composite film 50, a pulling force along opposite direction is still applied on the carbon nanotube/graphene composite film 50. The carbon nanotube/graphene composite film 50 is very straight and is twisted, thus a distance between adjacent carbon nanotubes decreases, and mechanical strength of the carbon nanotube composite wire 80 can be improved.

Figure 9:
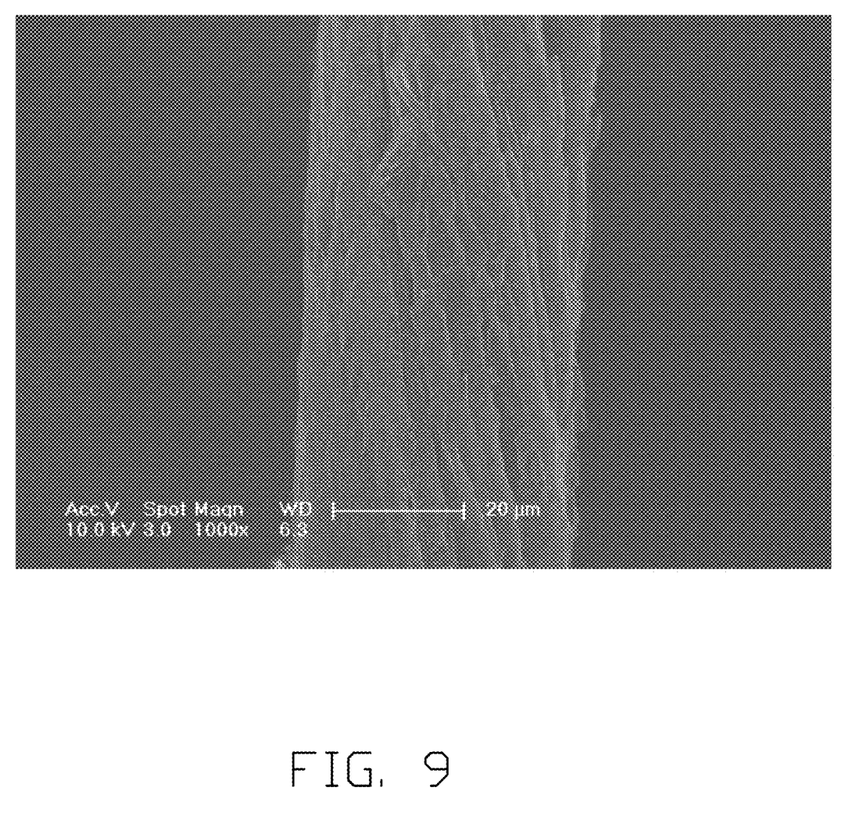
FIG. 9 is an SEM image of a carbon nanotube composite wire.

In one embodiment, the first supporter 60 and the second supporter 62 are made of a motor and a needle, and the needle is installed in the motor. The side CD of the carbon nanotube/graphene composite film 50 is located between opposite needle of the first supporter 60 and the needle of the second supporter 62. After starting the motor, the carbon nanotube/graphene composite film 50 is curled along the direction from side AB to side CD. And then, one motor stops to rotate and another motor continues to rotate, the composite wire 70 is twisted to form the carbon nanotube composite wire 80, as shown in FIG. 9.

Figure 10:
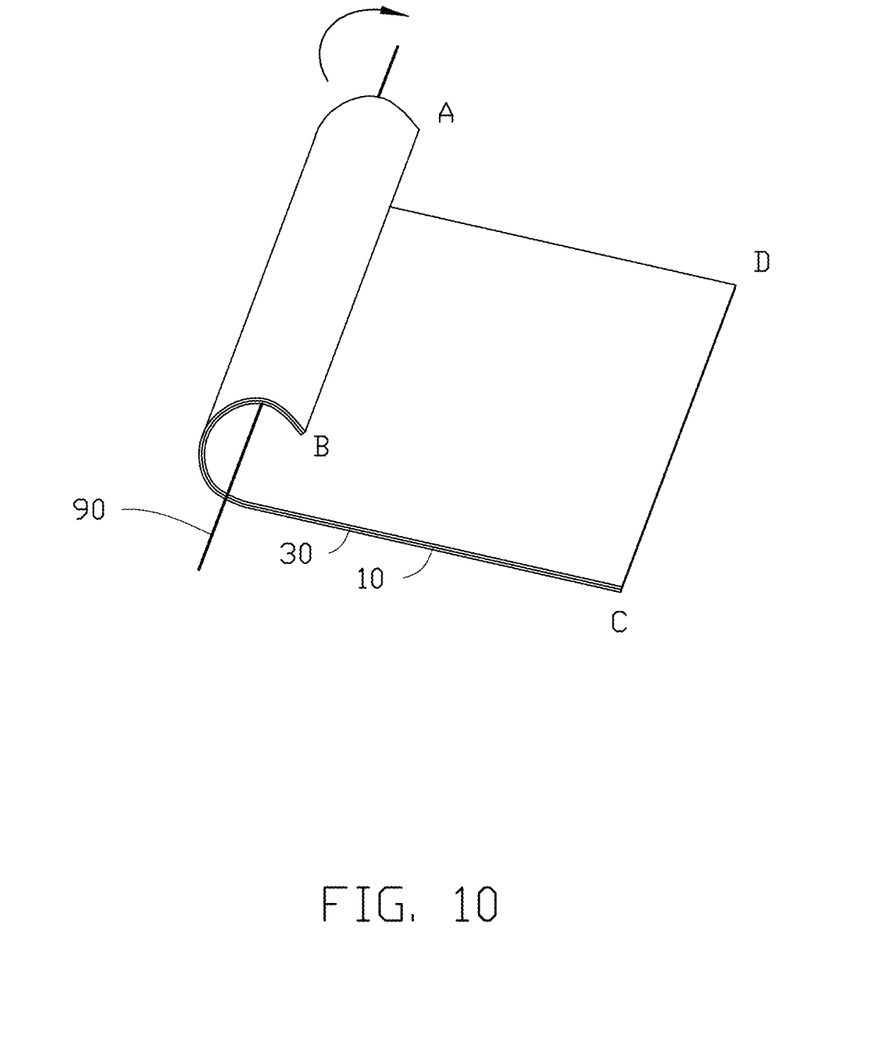
FIG. 10 is a schematic view of one embodiment of curling a carbon nanotube/graphene composite film.

Referring to FIG. 10, in the method (2), carbon nanotube/graphene composite film 50 is placed on a plane, and the graphene film 30 is supported by the carbon nanotube film 10. A linear substrate 90 can be located on the carbon nanotube/graphene composite film 50 and close to the side AB. The linear substrate 90 can be parallel to the side AB. The side AB is attached to the linear substrate 90, and the carbon nanotube/graphene composite film 50 is curled by rolling the linear substrate 90. The linear substrate 90 is removed to form the composite wire 70. The composite wire 70 is twisted to form the carbon nanotube composite wire 80.

Figure 11:
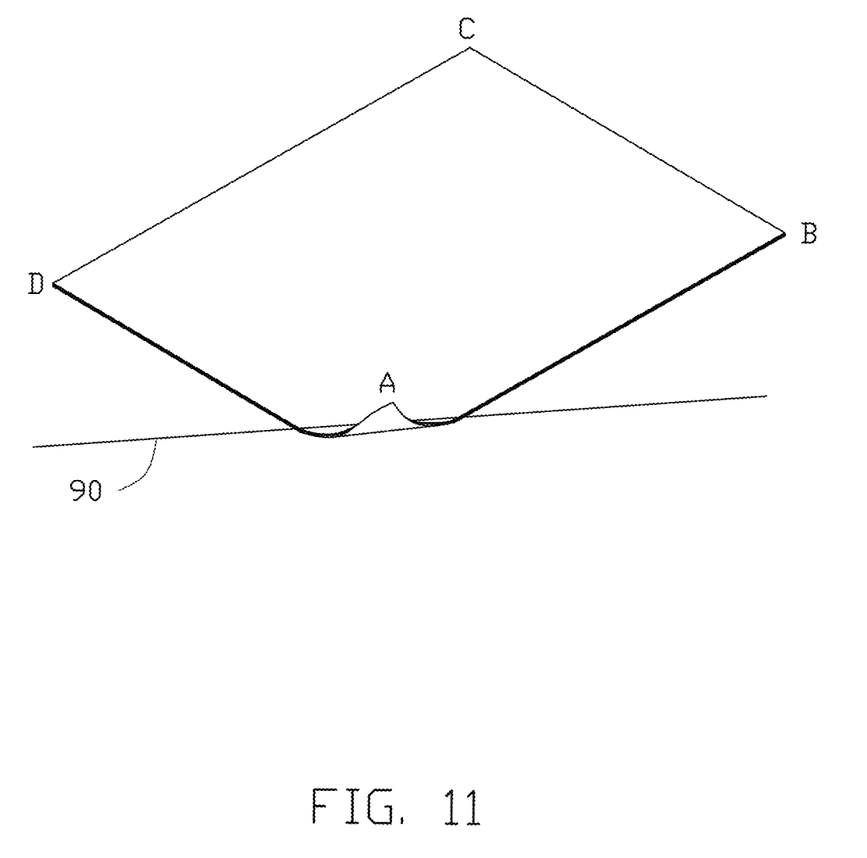
FIG. 11 is a schematic view of another embodiment of curling a carbon nanotube/graphene composite film.

Referring to FIG. 11, in the method (3), carbon nanotube/graphene composite film 50 is placed on the plane, and the graphene film 30 is supported by the carbon nanotube film 10. A linear substrate 90 can be located on the carbon nanotube/graphene composite film 50 and close to an endpoint A. The linear substrate 90 cannot be parallel to the side AB. The endpoint A is attached to the linear substrate 90, and the carbon nanotube/graphene composite film 50 is curled by rolling the linear substrate 90 along a diagonal AC. The linear substrate 90 is removed to form the composite wire 70. The composite wire 70 is twisted to form the carbon nanotube composite wire 80. In one embodiment, an angle between the linear substrate 90 and the side AB is 45 degrees.

It is to be understood, the carbon nanotube/graphene composite film 50 can include a plurality of carbon nanotube films 10 and a plurality of graphene films 30 alternatively stacked. In detail, a first carbon nanotube film 10 is pasted on a surface of the graphene film 30 away from the top surface 22 of the substrate 20. After removing the substrate 20 by the solution erosion technology, the first carbon nanotube film 10 is pasted with a second graphene film 30 grown on a second substrate 20, and the first carbon nanotube film 10 is between the first graphene film 30 and the second graphene film 30. And then the second substrate 20 is removed. Repeat above steps, the carbon nanotube/graphene composite film 50 including a plurality of carbon nanotube film 10 and a plurality of graphene film 30 alternatively stacked is formed.

The carbon nanotube composite wire 80 includes a plurality of carbon nanotubes and a plurality of graphene sheets. The plurality of carbon nanotubes are joined end to end by van der Waals attractive force therebetween. The plurality of carbon nanotubes helically oriented around an axial direction of the carbon nanotube composite wire 80. The plurality of graphene sheets are dispersed in the carbon nanotube composite wire 80 and joined together.

When the carbon nanotube film 10 are two layers of the drawn carbon nanotube films, and the angle between the aligned directions of the carbon nanotubes in two adjacent drawn carbon nanotube films is about 90 degrees. The number of the graphene film 30 is in a range from about 1 layer to about 5 layers. The carbon nanotube composite wire 80 has good mechanical strength and light weight.

The carbon nanotube/graphene composite film 50 is firstly curled and then twisted to form the carbon nanotube composite wire 80, the plurality of graphenes are squeezed and pressed together by a twisting force. Thus, the distance between adjacent carbon nanotubes decreases, and the van der Waals attractive force between adjacent carbon nanotubes increases, which improve the mechanical strength of the carbon nanotube composite wire 80. The twisting force can be in a range from about 0.005 Newton to about 0.01 Newton.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for making carbon nanotube composite wire comprising:
   providing at least one carbon nanotube film;
   growing a graphene film on a top surface of a substrate;
   placing the at least one carbon nanotube film on the graphene film;
   removing the substrate to form a carbon nanotube/graphene composite film; and
   curling the carbon nanotube/graphene composite film and then twisting.

2. The method of claim 1, wherein the at least one carbon nanotube film comprises a plurality of carbon nanotubes parallel to a surface of the at least one carbon nanotube film.

3. The method of claim 2, wherein the plurality of carbon nanotubes is joined end to end and extends along a same direction.

4. The method of claim 2, wherein the plurality of carbon nanotubes is entangled each other.

5. The method of claim 2, wherein the plurality of carbon nanotubes extends along different directions.

6. The method of claim 1, wherein the at least one carbon nanotube film comprises a plurality of first carbon nanotube wire structures and a plurality of second carbon nanotube wire structures intersect each other to form a carbon nanotube network structure.

7. The method of claim 6, wherein each of the plurality of first carbon nanotube wire structures and each of the plurality of second carbon nanotube wire structures comprises a plurality of untwisted carbon nanotube wires.

8. The method of claim 6, wherein each of the plurality of first carbon nanotube wire structures and each of the plurality of second carbon nanotube wire structures comprises a plurality of twisted carbon nanotube wires.

9. The method of claim 1, wherein the placing the at least one carbon nanotube film on the graphene film comprises:
   disposing a laminate structure comprising the at least one carbon nanotube film, the substrate, and the graphene film in a hot pressing device having a metal roll;
   heating the metal roll of the hot pressing device to a temperature from about 110° C. to about 120° C.; and
   hot pressing the laminate structure using the heated metal roll.

10. The method of claim 1, wherein the placing the at least one carbon nanotube film on the graphene film comprises:
   (a) infiltrating an organic solvent into a laminate structure comprising the at least one carbon nanotube film, the substrate, and the graphene film; and
   (b) removing the organic solvent to closely combine the carbon nanotube film and the graphene film together due to a surface tension of the organic solvent as the organic solvent volatilizes.

11. The method of claim 10, wherein the organic solvent is removed by a supercritical carbon dioxide method.

12. The method of claim 1, wherein the substrate is removed by a solution erosion technology.

13. The method of claim 12, wherein the substrate is made of copper, and the copper is eroded by a concentrated nitric acid.

14. The method of claim 1, wherein the carbon nanotube/graphene composite film is curled to form a cylindrical structure.

15. The method of claim 14, wherein the cylindrical structure is twisted along two opposite directions by a twisting force.

16. The method of claim 15, wherein the twisting force is in a range from about 0.005 Newton to about 0.01 Newton.

17. The method of claim 1, further comprising forming the carbon nanotube/graphene composite film by alternatively stacking a plurality of carbon nanotube films and a plurality of graphene films.

18. The method of claim 17, wherein the plurality of carbon nanotube films are two drawn carbon nanotube films comprising a plurality of carbon nanotubes, and an angle between an aligned directions of the plurality of carbon nanotubes in two adjacent drawn carbon nanotube films is about 90 degrees.

19. The method of claim 17, wherein the number of the plurality of graphene films is in a range from about 1 layer to about 5 layers.

20. The method of claim 1, further comprising placing the carbon nanotube/graphene composite film between two opposite supporters before curling the carbon nanotube/graphene composite film and twisting by rotating the two opposite supporters along two opposite directions, when a length of the at least one carbon nanotube film is 1 meter, the number of turns of rotating the two opposite supporter is in a range from about 1000 to about 1500.

* * * * *